(12) United States Patent
Rooney

(10) Patent No.: US 9,957,678 B2
(45) Date of Patent: May 1, 2018

(54) CATCH VESSEL FOR ANIMAL EXCREMENT SYSTEM AND METHOD

(71) Applicant: Annette Rooney, Chambersburg, PA (US)

(72) Inventor: Annette Rooney, Chambersburg, PA (US)

(*) Notice: Subject to any disclaimer, the term of this patent is extended or adjusted under 35 U.S.C. 154(b) by 0 days. days.

(21) Appl. No.: 15/635,125

(22) Filed: Jun. 27, 2017

(65) Prior Publication Data

US 2018/0002879 A1  Jan. 4, 2018

(51) Int. Cl.
*A01K 29/00* (2006.01)
*E01H 1/12* (2006.01)
*A01K 23/00* (2006.01)

(52) U.S. Cl.
CPC .......... *E01H 1/1206* (2013.01); *A01K 23/005* (2013.01); *E01H 2001/128* (2013.01)

(58) Field of Classification Search
CPC ............... E01H 1/1206; E01H 1/1213; E01H 2001/128; E01H 2001/1293; A01K 23/005; A61B 10/007
USPC .............................. 294/1.3, 1.4, 1.5; 600/574
See application file for complete search history.

(56) References Cited

U.S. PATENT DOCUMENTS

| | | | | |
|---|---|---|---|---|
| 3,490,501 A * | 1/1970 | Rene | ....................... | G01F 19/00 141/331 |
| 3,850,159 A | 11/1974 | Langley | | |
| 4,042,269 A * | 8/1977 | Skermetta | ............ | A01K 23/005 15/257.3 |
| 4,106,490 A * | 8/1978 | Spilman | ............... | A61B 10/007 600/574 |
| 4,889,249 A * | 12/1989 | Hulon | .................. | A61B 10/007 215/230 |
| 5,422,076 A * | 6/1995 | Jones | .................... | A61B 10/007 206/569 |
| 5,547,240 A * | 8/1996 | Hartshorn | ................ | A01B 1/02 294/49 |
| 6,554,334 B2 * | 4/2003 | Rincon Uribe | ....... | E01H 1/1206 15/104.8 |
| 6,602,231 B1 * | 8/2003 | Mariea | .................. | A61B 10/007 604/317 |
| 6,719,951 B1 | 4/2004 | Griffith | | |
| 7,128,352 B1 | 10/2006 | Phippen | | |
| 7,214,199 B1 * | 5/2007 | Yastrebov | ............ | A01K 23/005 600/573 |
| 7,762,596 B1 * | 7/2010 | Gaydos | ................ | A01K 23/005 119/161 |
| 7,775,568 B2 | 8/2010 | Scott | | |
| 7,981,053 B2 | 7/2011 | Fleshman | | |

(Continued)

*Primary Examiner* — Dean J Kramer
(74) *Attorney, Agent, or Firm* — Integrity Patent Group, PLC; Edwin Wold

(57) ABSTRACT

A catch vessel for animal excrement includes a catch vessel for animal excrement, the catch vessel including a collection vessel configured to receive and hold an animal excrement, a volumetric scale coupled to the collection vessel and configured to receive at least a portion of the animal excrement, the volumetric scale including a removable cover, an extension handle coupled to the collection vessel and the extension handle is configured to telescope between a retracted configuration and an extended configuration. The catch vessel for animal excrement is useful for collection of pet and animal excrement for testing.

19 Claims, 5 Drawing Sheets

(56) References Cited

U.S. PATENT DOCUMENTS

| | | | |
|---|---|---|---|
| 8,469,418 B2* | 6/2013 | Dougherty | A01K 23/005 119/161 |
| 9,339,013 B1* | 5/2016 | Naponelli | A01K 23/005 |
| 2004/0090073 A1* | 5/2004 | Edwards | A47L 13/52 294/1.3 |
| 2008/0228106 A1 | 9/2008 | Forte | |

\* cited by examiner

CATCH VESSEL FOR ANIMAL EXCREMENT SYSTEM AND METHOD

CROSS-REFERENCE TO RELATED APPLICATION

The present application is related to and claims priority to U.S. Provisional Patent Application No. 62/355,879 filed Jun. 29, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of animal husbandry and more specifically relates to animal excrement sample collections.

2. Description of Related Art

It can be difficult for people to collect an animal's urine or stool sample in a standard sample cup. These cups generally have a small rim, requiring either the animal or the individual holding the cup to have good aim. Additionally, people can get splashed from urine, which is unsanitary and highly unpleasant. Further, many animals squat when they relieve themselves, making it nearly impossible for people to slide a cup underneath their backend. A suitable solution is desired.

U.S. Pat. No. 7,128,352 to Geraldine Phippen relates to an animal urine specimen collection device. The described animal urine specimen collection device includes a device, method and kit for collection of a urine specimen from an animal includes a cup to receive and hold the urine specimen, a lid to close cup after collection of the specimen, and a holder with a generally upright center extension member, a handle connected at the upper end of the extension member, and a cup holder extending forwardly from the lower end of the extension member and having an opening slidably receiving the cup for manual positioning of the cup under the animal from which the urine specimen is to be collected.

BRIEF SUMMARY OF THE INVENTION

In view of the foregoing disadvantages inherent in the known animal excrement sample collections art, the present disclosure provides a novel catch vessel for animal excrement system and method. The general purpose of the present disclosure, which will be described subsequently in greater detail, is to provide a catch vessel for animal excrement system and method.

A catch vessel for animal excrement is disclosed herein. The catch vessel for animal excrement includes a collection vessel configured to receive and hold an animal excrement, a volumetric scale coupled to the collection vessel and configured to receive at least a portion of the animal excrement, and an extension handle coupled to the collection vessel.

According to another embodiment, a method for catching animal excrement is also disclosed herein. The method includes the steps of providing a catch vessel for animal excrement, installing sanitary liner, extending an extension handle of the catch vessel from a retracted length to an extended length, placing the catch vessel underneath an animal, collecting the animal excrement, measuring a sample of the animal excrement, removing the removable cover from the volumetric scale, and transferring the sample of the animal excrement from the volumetric scale.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a catch vessel for animal excrement system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to an animal husbandry and more particularly to a catch vessel for animal excrement system and method as used to improve the animal excrement sample collections.

Generally, a catch vessel for pets/animals for collection of pet and animal urine for testing is disclosed herein. The disclosed catch vessel may be particularly helpful to veterinarians and owners of diabetic animals that need frequent testing to determine insulin requirements, and may provide ease of use. The disclosed catch may include a large catch area, which may make it easy to get a specimen. The disclosed catch may further include a hood above the catch area to prevent urine splashing on the user's hand while collecting the specimen. Advantageously, the user may not have to get too close to get a specimen. Further, the animal's aim can be inaccurate, but the disclosed catch vessel can still collect a good, clean catch every time. According to one embodiment, the catch vessel may have a shape similar to a long hooded scoop with raised (e.g., "V" or "U shaped) sides and a long handle. In use, the user can hold the handle and slide the catch under the pet/animal when they squat or prepare to urinate. The handle can be made solid, or clear with printed graduations for measuring specimen volume. The catch vessel can be made in different sizes, depending on the size of the animal. The catch vessel can be made lower with the sides trimmed down and catch area shortened for small dogs/animals. A strong handle with an extension and larger catch area for horses and larger animals. Disposable plastic sleeves can be used to keep the catch clean for the next use, or can be stored in a bucket with disinfectant for next use.

Referring now more specifically to the drawings by numerals of reference, there is shown in FIGS. 1-4, various views of a catch vessel for animal excrement 100.

Figure 1:
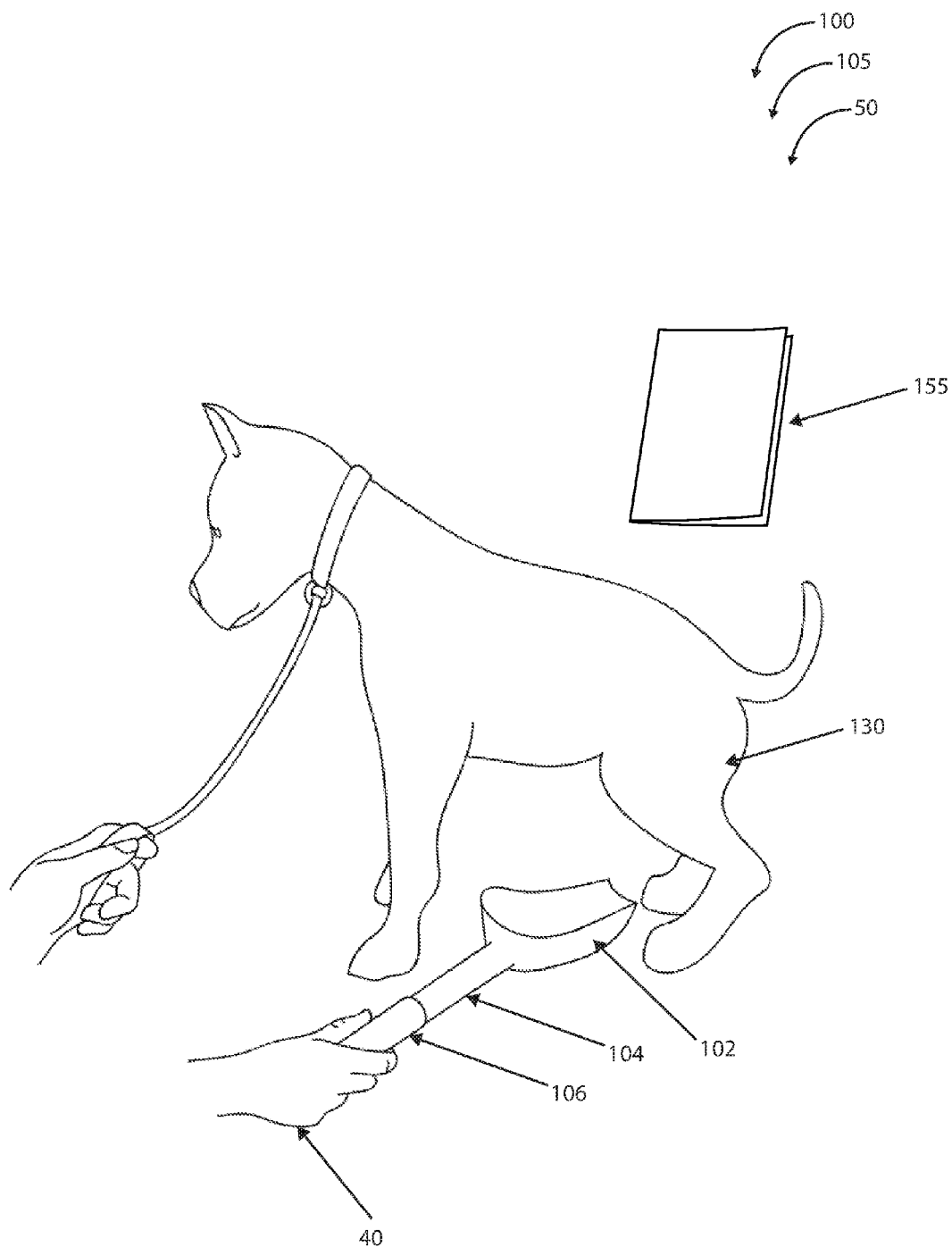
FIG. 1 is a perspective view of the catch vessel for animal excrement during an 'in-use' condition, according to an embodiment of the disclosure.

FIG. 1 shows a catch vessel 100 for animal excrement during an 'in-use' condition 50, according to an embodiment of the present disclosure. Here, the catch vessel 100 for animal excrement may be beneficial for use by a user 40 to collect animal excrement for analysis. As illustrated, the catch vessel 100 for animal excrement may include a collection vessel 102 that may be configured to receive and hold an animal excrement of a predetermined animal 130 and wherein the collection vessel 102 is configured to hold at least 10 percent of a typical excrement quantity for the predetermined animal 130 for testing. The catch vessel 100 can be arranged such that a volumetric scale 104 may be coupled to the collection vessel 102 and configured to receive at least a portion of the animal excrement to be tested. As shown, an extension handle 106 may be coupled to the collection vessel 102, and may be configured to position the collection vessel 102 for the collection of the animal excrement by the user 40 from a standing position of the user 40.

According to one embodiment, the catch vessel for animal excrement 100 may be arranged as a kit 105. In particular, the catch vessel 100 for animal excrement may further include a set of instructions 155. The instructions 155 may detail functional relationships in relation to the structure of the catch vessel 100 for animal excrement (such that the catch vessel 100 for animal excrement can be used, maintained, or the like, in a preferred manner).

Figure 2:
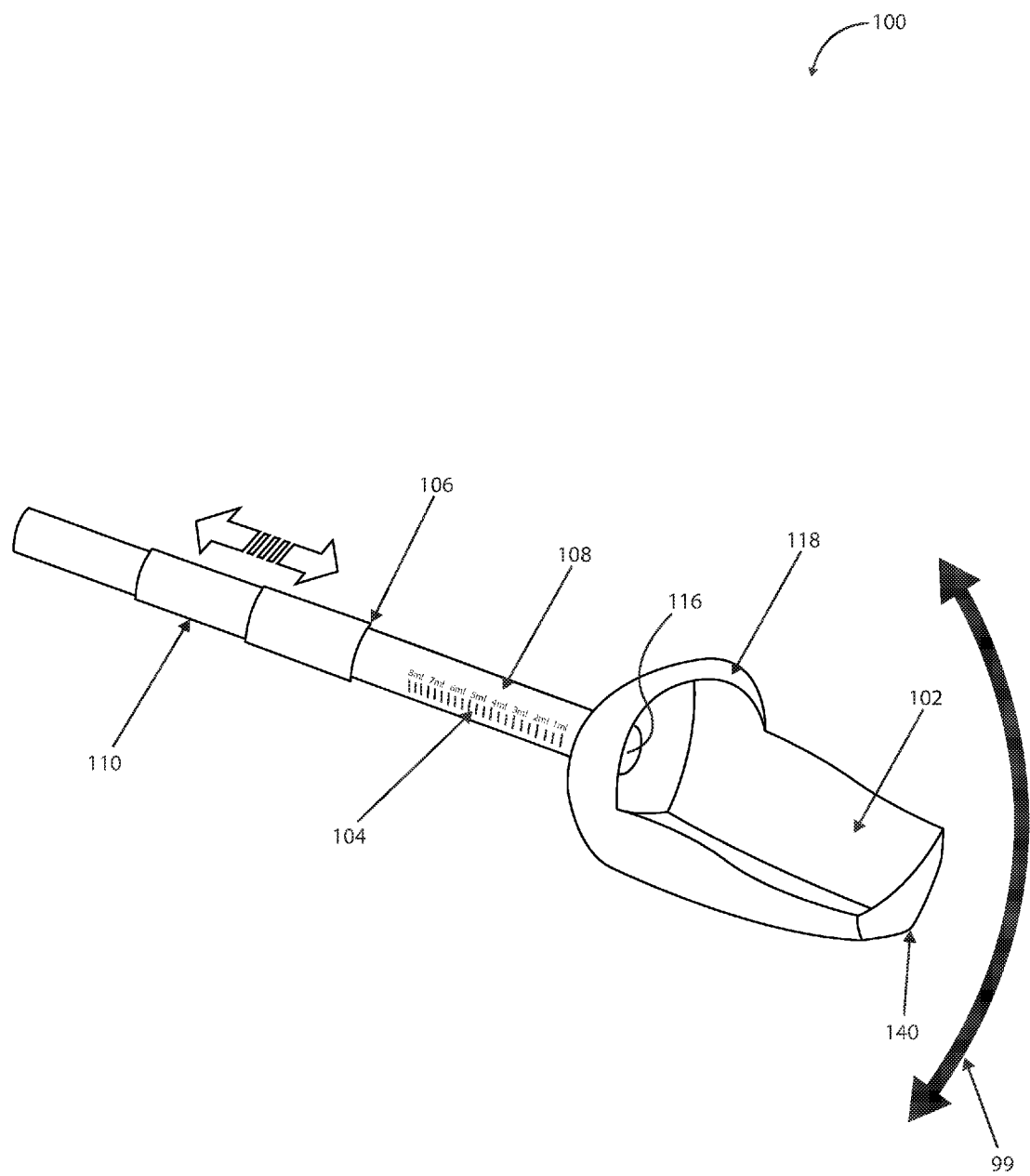
FIG. 2 is a perspective view of the catch vessel for animal excrement of FIG. 1.

FIG. 2 is a perspective view of the catch vessel for animal excrement of FIG. 1. As above, the catch vessel 100 for animal excrement may include the collection vessel 102 configured to receive and hold the animal excrement, the volumetric scale 104 coupled to the collection vessel 102 and configured to receive at least a portion of the animal excrement, and an extension handle 106 coupled to the collection vessel 102, wherein the extension handle 106 is coupled to the collection vessel 102 via the volumetric scale 104. It should be noted that the animal excrement being referenced in most cases is a liquid animal excrement sample.

According to the illustrated embodiment, the collection vessel 102 may also include a "V"-shaped bottom 140 to reduce splash-out of the animal excrement. According to one embodiment, the collection vessel 102 may be configured to receive the animal excrement while resting on a ground surface, for example by having a flattened outer bottom, by including stand element, or any combination thereof.

As shown, t the volumetric scale 104 may be embodied as a graduated cylinder 108. As shown, the volumetric scale 104 may be transparent, or otherwise configured to provide for visual inspect and/or measurement of the animal excrement.

According to a preferred embodiment, the volumetric scale 104 may be fluidly coupled to the collection vessel 102, for example and as illustrated, the collection vessel 102 and the volumetric scale 104 may share a common passageway 116 where, by definition, a liquid leaving one enters the other. Further, the volumetric scale 104 may be configured to receive the liquid animal excrement sample upon rotating the catch vessel for animal excrement 100 about a collection axis 99, for example, such that at least a portion of the collection vessel 102 is elevated above the volumetric scale 104 and the liquid is gravity fed from the collection vessel 102 to the volumetric scale 104 via the common passageway 116.

According to one embodiment, the extension 106 handle may be configured to telescope between a retracted configuration and an extended configuration 110. According to another embodiment, portions or at least one portion of the extension handle 106 may be solid.

According to one embodiment, the catch vessel 100 may include a handle spill guard 118. The handle spill guard 118 may fixed to the collection vessel 102, for example, at an end interfacing with the volumetric scale 104. Further, the handle spill guard 118 may be configured to limit spillage of the liquid animal excrement sample from the collection vessel 102 upon rotation of the catch vessel for animal excrement 100 about the collection axis, for example by including edges that remain raised above an expected fluid level throughout 90 degrees of rotation between horizontal and vertical.

Figure 3:
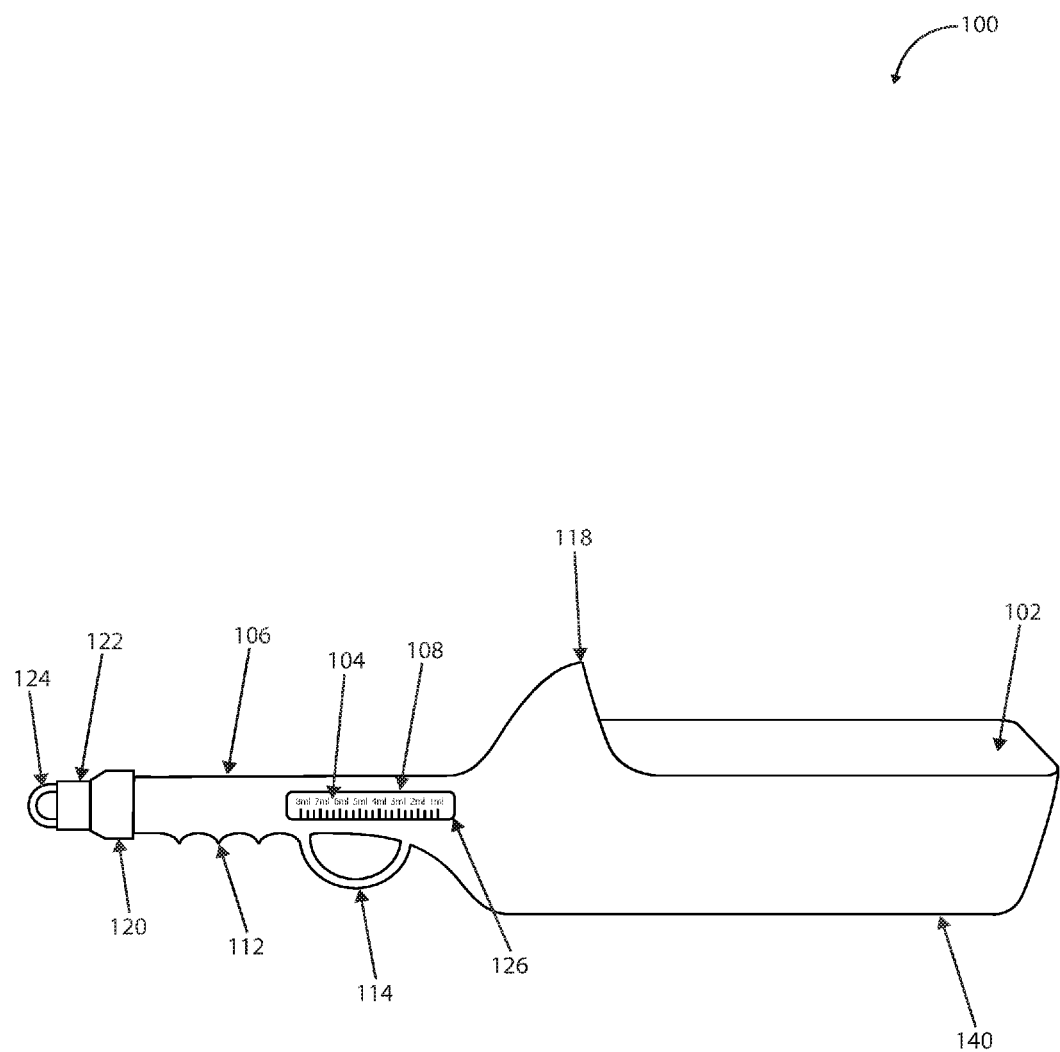
FIG. 3 is a side view of a catch vessel for animal excrement, according to another embodiment of the present disclosure.

FIG. 3 shows a side view of the catch vessel for animal excrement according to another embodiment of the present disclosure. In particular, here a more robust example of the catch vessel 100 for animal excrement is illustrated. This embodiment may be more desirable for use with larger animals, such as livestock, or exotic wildlife, for example. As above, the catch vessel 100 may include the collection vessel 102, the volumetric scale 104, and the extension handle 106.

According to one embodiment, the catch vessel 100 may further include a disposal port 120 and a removable cover 122. The disposal port 120 may be positioned on the extension handle 106 or the volumetric scale 104, distal from the collection vessel 102, and may be configured to release the liquid animal excrement sample (e.g., provide an exit path) while in an open configuration (not shown). In particular, here the collection vessel 102, the volumetric scale 104, and the extension handle 106 are fluidly coupled via a common passageway (e.g., common passageway 116 of FIG. 2). The removable cover 122 may screw on, or otherwise removably attach to the disposal port 120, and may be configured to retain the liquid animal excrement sample while in a closed configuration (shown).

According to one embodiment, the removable cover 122 may include an integrated ring 124. The integrated ring 124 may be configured for attachment of accessories, such as a wrist strap for example. Likewise, the integrated ring 124 may be configured for hanging the catch vessel 100 during storage for example.

According to one embodiment portions or at least one portion of the extension handle 106 may include ergonomic features, such as an ergonomic grip 112, a finger loop 114, and other features to ensure better control. This may be beneficial when working with predetermined animals of greater statute or different angles of access.

According to one embodiment, the volumetric scale 104 may include at least one transparent portion 126 configured to enable visual inspection the animal excrement As above, the catch vessel 100 may also include the handle spill guard 118. Likewise, the handle spill guard 118 may be fixed to the collection vessel 102, and configured to limit spillage of the liquid animal excrement sample from the collection vessel 102 upon rotation of the catch vessel 100 about the collection axis 99 (FIG. 2). Further, the catch vessel 100 may also include the "V"-shaped bottom 140 configured to reduce splash-out of the animal excrement. The "V"-shaped bottom 140 may also provide greater structural integrity.

Figure 4:
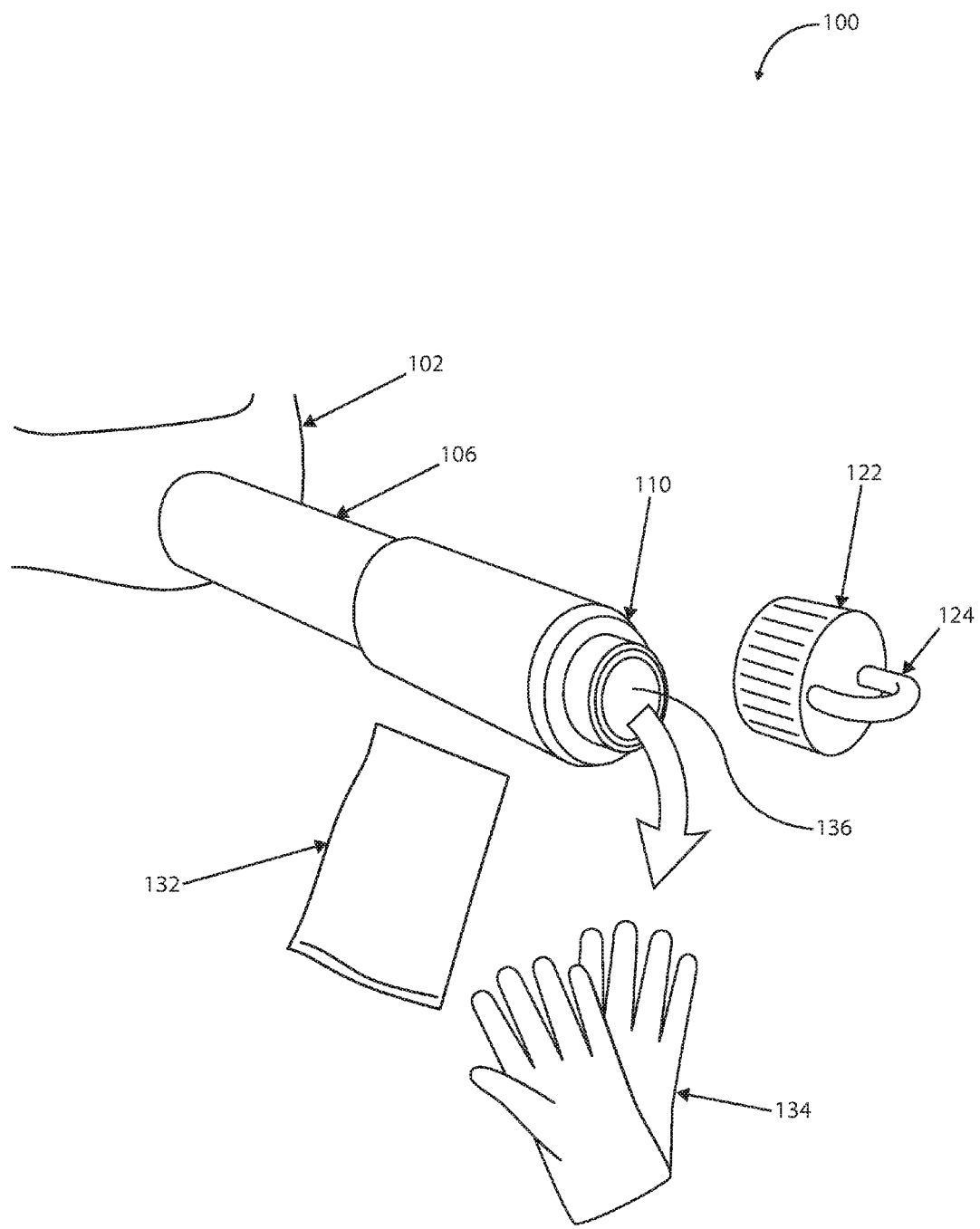
FIG. 4 is a perspective view of a detail of a catch vessel for animal excrement, according to yet another embodiment of the present disclosure.

FIG. 4 is a perspective view of a detail of the catch vessel for animal excrement, according to yet another embodiment of the present disclosure. In particular, here the collection vessel 102 is not fluidly coupled to the extension handle 106. As such, the extension handle 106 may then be configured for storage. Further, according to one alternate embodiment, the catch vessel 100 may omit the volumetric scale 104 entirely, and portions or at least one portion of the extension handle 106 may be solid.

According to one embodiment, the extension handle 106 may include an internal cavity 136. Further, internal cavity 136 may be fluidly isolated from the collection vessel 102 and/or the volumetric scale 104. In this configuration, the internal cavity 136 of the extension handle 106 may be arranged as a storage for gloves 134 and/or sanitary liners 132 that may be used with the catch vessel 100, for example. As above, the removable cover 122, here to secure or close the internal cavity 136. Also as above, the removable cover 122 may include the integrated ring 124, for example, configured for attachment of accessories such as a wrist strap and the integrated ring 124, and may also be useful for hanging the catch vessel 100 on a hook or nail when storing.

According to one embodiment the catch vessel 100, or a kit thereof, may include one or more of the disposable sanitary liner 132. The sanitary liner 132 may be generic in shape or form fitting in shape to line the collection vessel 102 and/or the volumetric scale 104 for sanitary purposes.

Upon reading this specification, it should be appreciated that, under appropriate circumstances, considering such issues as user preferences, design preference, structural requirements, marketing preferences, cost, available materials, technological advances, etc., other embodiment arrangements such as, for example, collection vessel 102 shapes and sizes, extension handle 106 configurations, and volumetric scale 104 displacement, etc. are contemplated.

Figure 5:
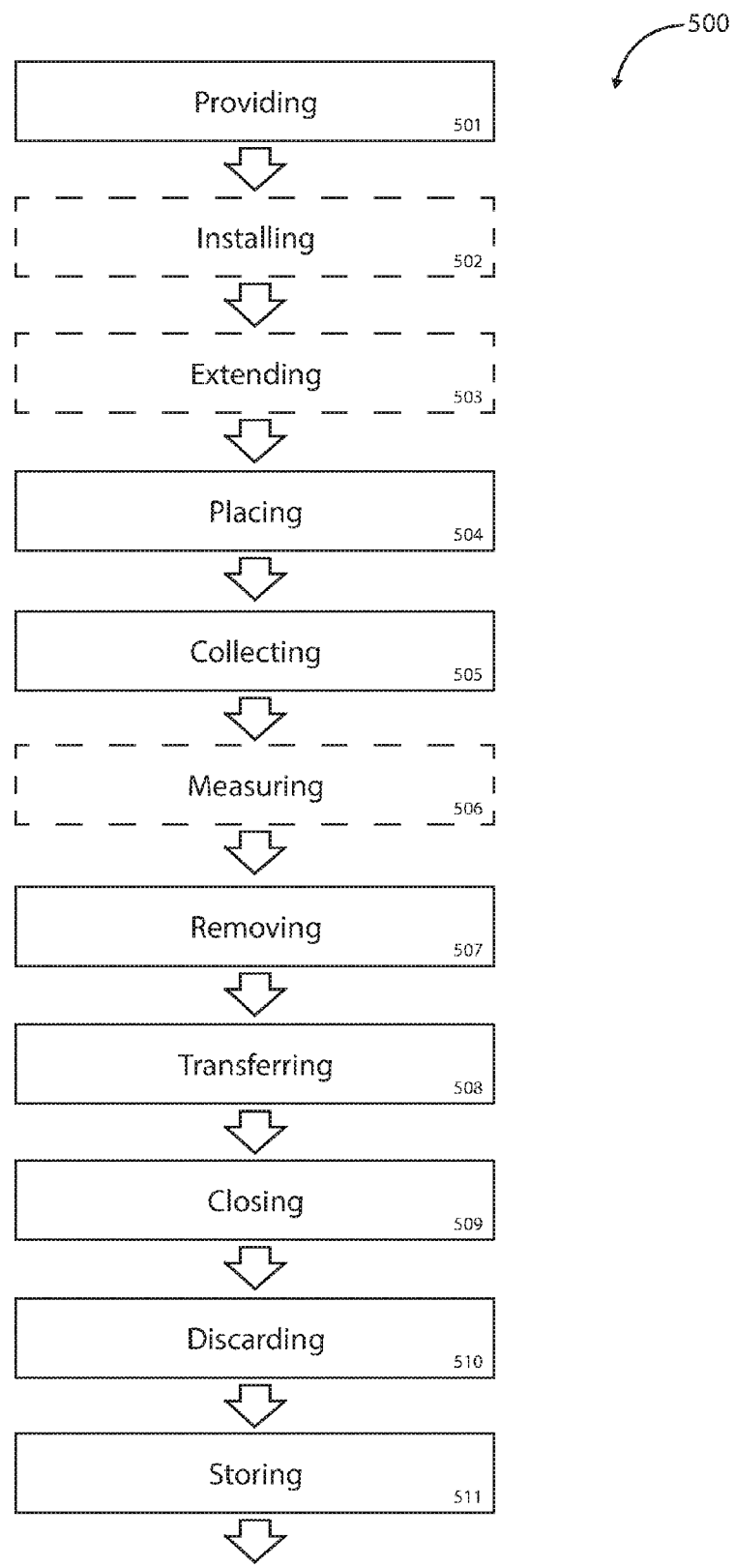
FIG. 5 is a flow diagram illustrating a method of use/for catching animal excrement, according to an embodiment of the present disclosure.

FIG. 5 is a flow diagram illustrating a method for catching animal excrement, according to an embodiment of the present disclosure. In particular, the method for catching animal excrement 500 may include one or more components or features of the catch vessel 100 for animal excrement as described above. As illustrated, the method for catch vessel for animal excrement 500 may include the steps of: step one 501, providing a catch vessel for animal excrement, the catch vessel including a collection vessel configured to receive and hold an animal excrement, a volumetric scale coupled to the collection vessel and configured to receive at least a portion of the animal excrement, the volumetric scale including a removable cover, and an extension handle coupled to the collection vessel; step two 502, installing sanitary liner onto at least one portion of the catch vessel that is intended to come into contact with the animal excrement; step three 503, extending the extension handle from a retracted length to an extended length; step four 504, placing the catch vessel underneath an animal and in a position to collect the animal excrement; step five 505, collecting the animal excrement from the animal; step six 506, measuring a sample of the animal excrement; step seven 507, removing the removable cover from the volumetric scale; step eight 508, transferring the sample of the animal excrement from the volumetric scale; step nine 509, closing the removable cover; step ten 510, discarding the sanitary liner; and step eleven 511, storing the catch vessel. During a first use, the user may want to have the pet or animal on a leash or otherwise restrained. Standing next to the animal, and when they prepare to eliminate, the user may gently slide the catch underneath. The "V"-shaped bottom may mitigate splash-out of specimen. Similarly, the hood/handle spill guard may mitigate splash onto a user's hand.

It should be noted that steps 502, 503 and 506 may be optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for catch vessel for animal excrement (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A catch vessel for animal excrement, the catch vessel comprising:
   a collection vessel configured to receive and hold an animal excrement;
   a volumetric scale coupled to the collection vessel and configured to receive at least a portion of the animal excrement; and
   an extension handle coupled to the collection vessel;
   wherein the extension handle is coupled to the collection vessel via the volumetric scale.

2. The catch vessel of claim 1, wherein the volumetric scale is a graduated cylinder.

3. The catch vessel of claim 1, wherein the extension handle is configured to telescope between a retracted configuration and an extended configuration.

4. The catch vessel of claim 1, wherein the extension handle is solid and includes an ergonomic grip having a finger loop.

5. The catch vessel of claim 1, wherein the extension handle includes an internal cavity configured as a storage for gloves and sanitary liners of the catch vessel.

6. The catch vessel of claim 1, wherein the collection vessel configured to receive the animal excrement while resting on a ground surface.

7. The catch vessel of claim 1, wherein the animal excrement is a liquid animal excrement sample; and
wherein the volumetric scale is fluidly coupled to the catch vessel, and the volumetric scale is further configured to receive the liquid animal excrement sample upon rotating the catch vessel about a collection axis such that at least a portion of the collection vessel is elevated above the volumetric scale.

8. The catch vessel of claim 7, further comprising a handle spill guard, the handle spill guard fixed to the collection vessel, and configured to limit spillage of the liquid animal excrement sample from the collection vessel upon rotation of the catch vessel about the collection axis.

9. The catch vessel of claim 7, wherein the volumetric scale includes a disposal port distal from the collection vessel, and a removable cover configured to retain the liquid animal excrement sample while in a closed configuration and to release the liquid animal excrement sample while in an open configuration.

10. The catch vessel of claim 9, wherein the removable cover includes an integrated ring configured for attachment of accessories.

11. The catch vessel of claim 1, wherein the volumetric scale includes least one transparent portion configured to enable a user to visually inspect the animal excrement.

12. The catch vessel of claim 1, wherein the collection vessel includes a "V"-shaped bottom configured to reduce splash-out of the animal excrement.

13. The catch vessel of claim 1, wherein the catch vessel is adapted for a predetermined animal; and
wherein the collection vessel is configured to hold at least 10 percent of a typical excrement quantity for the predetermined animal.

14. The catch vessel of claim 1, further comprising a disposable sanitary liner configured to line at least one of the collection vessel and the volumetric scale.

15. The catch vessel of claim 1, wherein the extension handle is configured to position the collection vessel for the collection of the animal excrement by the user from a standing position of the user.

16. A catch vessel for animal excrement, the catch vessel comprising:
a collection vessel configured to receive and hold an animal excrement;
a volumetric scale coupled to the collection vessel and configured to receive at least a portion of the animal excrement;
an extension handle coupled to the collection vessel;
a handle spill guard fixed to the collection vessel, and configured to limit spillage of the liquid animal excrement sample from the collection vessel upon rotation of the catch vessel about a collection axis; and
a disposable sanitary liner configured to line at least one of the collection vessel and the volumetric scale; and
wherein the extension handle is coupled to the collection vessel via the volumetric scale;
wherein the volumetric scale is a graduated cylinder;
wherein the extension handle is configured to telescope between a retracted configuration and an extended configuration;
wherein the extension handle includes an ergonomic grip having a finger loop;
wherein the extension handle includes an internal cavity configured as a storage for gloves and sanitary liners of the catch vessel;
wherein the collection vessel is configured to receive the animal excrement while resting on a ground surface;
wherein the animal excrement is a liquid animal excrement sample;
wherein the volumetric scale is fluidly coupled to the catch vessel, and the volumetric scale is further configured to receive the liquid animal excrement sample upon rotating the catch vessel about the collection axis such that at least a portion of the collection vessel is elevated above the volumetric scale;
wherein a removable cover includes an integrated ring configured for attachment of accessories;
wherein the volumetric scale includes least one transparent portion configured to enable a user to visually inspect the animal excrement;
wherein the collection vessel includes a "V"-shaped bottom configured to reduce splash-out of the animal excrement;
wherein the catch vessel is adapted for a predetermined animal;
wherein the collection vessel is configured to hold at least 10 percent of a typical excrement quantity for the predetermined animal; and
wherein the extension handle is configured to position the collection vessel for the collection of the animal excrement by the user from a standing position of the user.

17. The catch vessel for animal excrement system of claim 16, further comprising a set of instructions; and
wherein the catch vessel is arranged as a kit.

18. A method for catching animal excrement, the method comprising the steps of:
providing a catch vessel for animal excrement, the catch vessel including
a collection vessel configured to receive and hold an animal excrement,
a volumetric scale coupled to the collection vessel and configured to receive at least a portion of the animal excrement, the volumetric scale including a removable cover, and
an extension handle coupled to the collection vessel;
installing sanitary liner onto at least one portion of the catch vessel that is intended to come into contact with the animal excrement;
extending the extension handle from a retracted length to an extended length;
placing the catch vessel underneath an animal and in a position to collect the animal excrement;
collecting the animal excrement from the animal;
measuring a sample of the animal excrement;
removing the removable cover from the volumetric scale; and
transferring the sample of the animal excrement from the volumetric scale.

19. The method of claim 18, further comprising the steps of:
closing the removable cover;
discarding the sanitary liner; and
storing the catch vessel.

* * * * *